United States Patent
Nakamura et al.

(10) Patent No.: US 10,502,555 B2
(45) Date of Patent: Dec. 10, 2019

(54) LASER PROCESSING SYSTEM HAVING MEASUREMENT FUNCTION

(71) Applicant: FANUC CORPORATION, Yamanashi (JP)

(72) Inventors: Minoru Nakamura, Yamanashi (JP); Yoshinori Murakami, Yamanashi (JP); Yuuki Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/949,672

(22) Filed: Apr. 10, 2018

(65) Prior Publication Data

US 2018/0299260 A1 Oct. 18, 2018

(30) Foreign Application Priority Data

Apr. 18, 2017 (JP) ................................. 2017-082131

(51) Int. Cl.
*G01B 11/24* (2006.01)
*B23K 26/03* (2006.01)
(Continued)

(52) U.S. Cl.
CPC ............ *G01B 11/24* (2013.01); *B23K 26/032* (2013.01); *B23K 26/082* (2015.10);
(Continued)

(58) Field of Classification Search
CPC ..... G01B 11/24; G01B 11/2518; G06T 17/00; G05B 19/404; B23K 26/082; B23K 26/28;
(Continued)

(56) References Cited

U.S. PATENT DOCUMENTS 6,611,617 B1 * 8/2003 Crampton .......... G01B 11/2518
356/614
7,609,875 B2 * 10/2009 Liu .......................... A61C 7/00
359/287

(Continued)

FOREIGN PATENT DOCUMENTS

JP S64-15297 A 1/1989
JP S64-83393 A 3/1989
(Continued)

*Primary Examiner* — Maurice C Smith
(74) *Attorney, Agent, or Firm* — Hauptman Ham, LLP

(57) ABSTRACT

A laser processing system having a measurement function. The laser processing system includes a processing head configured to irradiate an object with a laser beam in a scanning manner via an optical system for processing; an illumination-light emitting section provided in the processing head, and configured to cause illumination light to be emitted from the processing head toward the object along an optical axis of the optical system for processing; a light receiving section located in a predetermined positional relationship with the illumination-light emitting section, and configured to receive a reflection of the illumination light reflected at an irradiated point on the object; and a measurement section configured to process the reflection received by the light receiving section and obtain three-dimensional measurement data of the irradiated point.

15 Claims, 12 Drawing Sheets

(51) Int. Cl.
  *B23K 26/08* (2014.01)
  *B23K 26/38* (2014.01)
  *B23K 26/21* (2014.01)
  *B23K 26/082* (2014.01)

(52) U.S. Cl.
  CPC ...... *B23K 26/0853* (2013.01); *B23K 26/0869* (2013.01); *B23K 26/0884* (2013.01); *B23K 26/21* (2015.10); *B23K 26/38* (2013.01)

(58) Field of Classification Search
  CPC .. B23K 26/21; B23K 26/0876; B23K 26/362; B23K 26/34; B23K 26/00; B23K 26/352; B23K 26/38
  See application file for complete search history.

(56) References Cited

U.S. PATENT DOCUMENTS

| | | | | |
|---|---|---|---|---|
| 8,350,514 | B2* | 1/2013 | Otsuki | G05B 19/404 |
| | | | | 318/568.15 |
| 9,098,931 | B2* | 8/2015 | Shpunt | G01B 11/2518 |
| 9,179,106 | B2* | 11/2015 | Takayama | H04N 7/183 |
| 9,789,462 | B2* | 10/2017 | Singh | B01J 19/121 |
| 9,844,882 | B2* | 12/2017 | Takizawa | B25J 9/1694 |
| 2002/0162973 | A1* | 11/2002 | Cordingley | B23K 26/032 |
| | | | | 250/492.2 |
| 2008/0259336 | A1* | 10/2008 | Konno | A61B 5/4547 |
| | | | | 356/404 |
| 2010/0174407 | A1* | 7/2010 | Fukawa | B23K 26/04 |
| | | | | 700/245 |
| 2011/0290780 | A1 | 12/2011 | Sievi | |
| 2012/0182376 | A1 | 7/2012 | Saito et al. | |
| 2012/0302121 | A1* | 11/2012 | Sbar | B23K 26/0096 |
| | | | | 445/2 |
| 2015/0076125 | A1* | 3/2015 | Toyosawa | B01J 19/12 |
| | | | | 219/121.73 |
| 2017/0109874 | A1* | 4/2017 | Hallasch | B23K 26/14 |
| 2017/0136578 | A1* | 5/2017 | Yoshimura | B23K 26/0093 |
| 2019/0143454 | A1* | 5/2019 | Choi | B23K 26/0648 |
| | | | | 264/1.37 |

FOREIGN PATENT DOCUMENTS

| | | |
|---|---|---|
| JP | 2011-96694 A | 5/2011 |
| JP | 2012-148316 A | 8/2012 |
| JP | 2013-108977 A | 6/2013 |
| JP | 2016-209922 A | 12/2016 |

* cited by examiner

# LASER PROCESSING SYSTEM HAVING MEASUREMENT FUNCTION

RELATED APPLICATIONS

The present application claims priority to Japanese Patent Application No. 2017-082131 filed on Apr. 18, 2017, the disclosure of which is hereby incorporated by reference herein in its entirety.

BACKGROUND OF THE INVENTION

1. Field of the Invention

The present invention relates to a laser processing system having a measurement function.

2. Description of the Related Art

A configuration of a laser processing system, which includes a processing head configured to irradiate a workpiece with a laser beam in a scanning manner and a camera provided within the processing head and configured to take a picture of the workpiece, is known (see, e.g., Japanese Unexamined Patent Publication No. 2012-148316 (JP 2012-148316 A)). JP 2012-148316 A describes that "the configuration includes a laser oscillator 41 for generating a laser beam L, a camera 56 for taking a picture of a workpiece W, a polarization beam splitter 46 located on the emitting path of the laser beam L and configured to transmit the laser beam L and make the light receiving axis of the camera 56 substantially coincide with the emitting axis of the laser beam L, an illumination light source 53 for generating illumination light to illuminate the workpiece W, the illumination light including wavelength substantially identical to the wavelength of the laser beam L, a half mirror 54 for making the emitting axis of the illumination light substantially coincide with the emitting axis of the laser beam L, a control section 32 for controlling the power of the laser beam L, and a shutter 55 located between the camera and the polarized beam splitter 46 on the light receiving path of the camera 56 and configured to block light returning from the workpiece N based on a power control signal for the laser beam L."

SUMMARY OF THE INVENTION

In a laser processing system including a processing head for irradiating an object with a laser beam in a scanning manner, there is a demand for additionally providing the system with the function of measuring the position, the shape, the processing quality, etc., of a portion to be processed (hereinafter referred to as a target portion) of the object and making it possible to reduce an influence exerted on the measurement function even when mechanical components including the processing head are subjected to thermal displacement or aging.

One aspect of the present disclosure provides a laser processing system comprising a processing head configured to irradiate an object with a laser beam in a scanning manner via an optical system for processing; an illumination-light emitting section provided in the processing head, and configured to cause illumination light to be emitted from the processing head toward the object along an optical axis of the optical system for processing; a light receiving section located in a predetermined positional relationship with the illumination-light emitting section, and configured to receive a reflection of the illumination light reflected at an irradiated point on the object; and a measurement section configured to process the reflection received by the light receiving section and obtain three-dimensional measurement data of the irradiated point.

The laser processing system according to one aspect has a configuration in which the illumination-light emitting section provided in the processing head causes the illumination light to be emitted toward the object along the optical axis of the optical system for processing, and the light receiving section located in the predetermined positional relationship with the illumination-light emitting section receives the reflection of the illumination light reflected at the irradiated point on the object, and therefore it is possible to reduce an influence exerted on the measurement function due to variation in the relative positional relationship between the processing head and the light receiving section, even when the processing head or the light receiving section is subjected to thermal displacement or aging. For example, when the positional relationship between the illumination-light emitting section and the light receiving section varies, the three-dimensional measurement data of the irradiated point, obtained by the measurement section, contains an error due to the variation in the positional relationship. However, since the position of the processing head provided with the illumination-light emitting section contains, in itself, relative variation, the error is canceled out when the three-dimensional measurement data is used to correct the position of the processing head or verify the processing quality of the target portion. As a result, in the laser processing system according to one aspect, it is possible to appropriately investigate whether it is necessary to correct a command for the position or scanning motion of the processing head, or appropriately verify the processing quality of the target portion of the object, by using the three-dimensional measurement data of the irradiated point obtained by the measurement section, while eliminating the influence of the thermal displacement or aging.

BRIEF DESCRIPTION OF THE DRAWINGS

The objects, features and advantages of the present disclosure will become more apparent from the following description of the embodiments in connection with the accompanying drawings, wherein.

DETAILED DESCRIPTION

Figure 1:
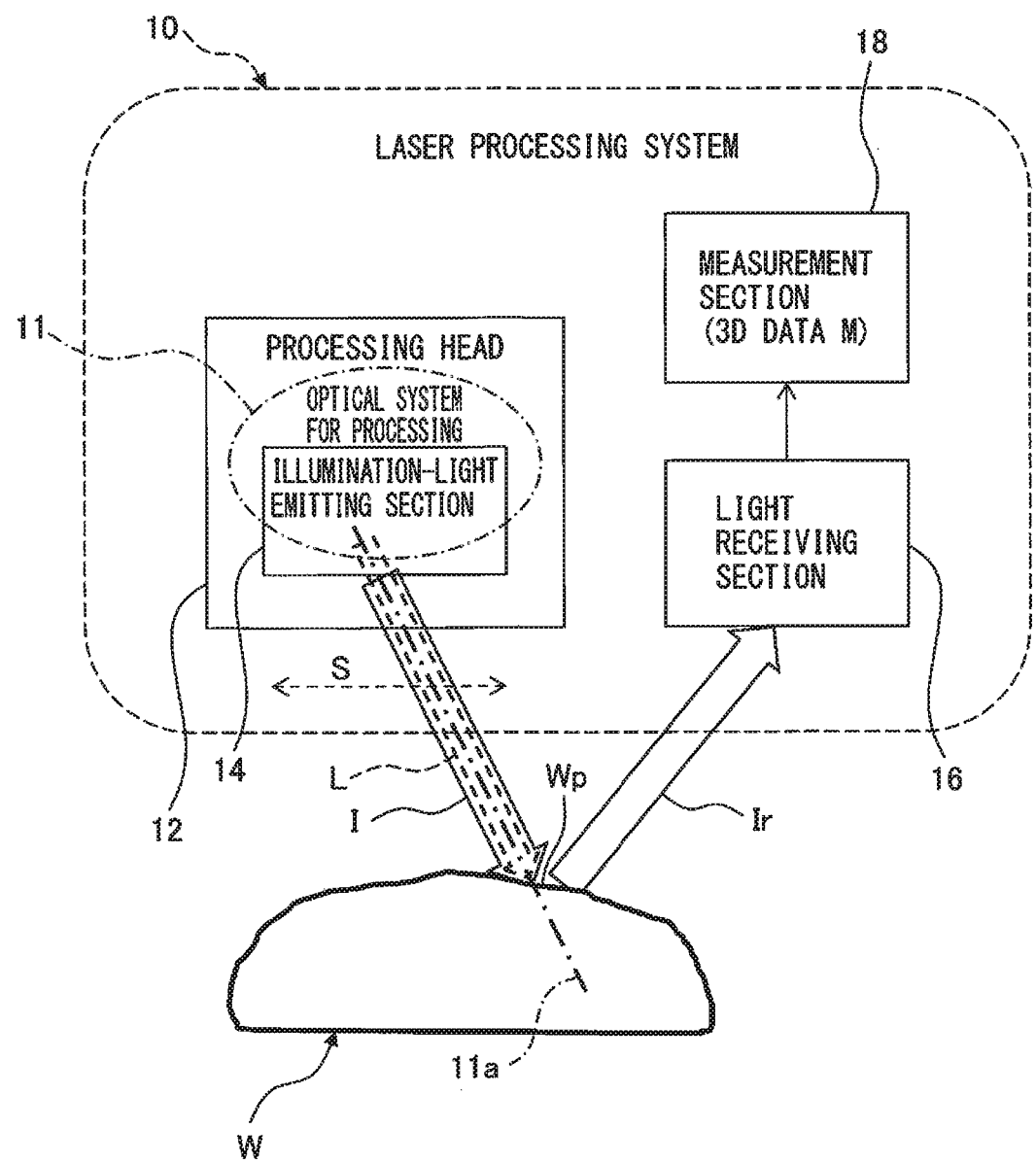
FIG. 1 is a functional block diagram schematically illustrating the configuration of a laser processing system according to one aspect.

Embodiments of the present disclosure will be described below with reference to the accompanying drawings. Throughout the drawings, corresponding components are denoted by common reference numerals.

FIG. 1 illustrates the configuration of a laser processing system 10 according to one aspect, with use of functional blocks. The laser processing system 10 includes a processing head 12 configured to irradiate an object W with a laser beam L in a scanning manner (depicted by a directional broken line S) via an optical system for processing 11; an illumination-light emitting section 14 provided in the processing head 12 and configured to cause illumination light I to be emitted from the processing head 12 toward the object W along an optical axis 11a of the optical system for processing 11; a light receiving section 16 located in a predetermined positional relationship with the illumination-light emitting section 14 and configured to receive a reflection Ir of the illumination light I reflected at an irradiated point Wp on the object W; and a measurement section 18 configured to process the reflection Ir received by the light receiving section 16 and obtain three-dimensional measurement data M of the irradiated point Wp.

The laser processing system 10 may have various system configurations for performing various types of laser processing, such as cutting, welding, heat treating, marking, etc., on the object W. In addition, the laser processing system 10 is capable of measuring the position, shape, processing quality, etc., of a portion to be processed (i.e., a target portion), in the case where the object W is an object to be processed (hereinafter referred to as a workpiece), or measuring the position or shape of the outer surface of the object W other than the workpiece, due to the provision of the illumination-light emitting section 14, the light receiving section 16 and the measurement section 18.

The laser processing system 10 can usually perform a desired laser processing, at high-speed, on the target portion of the object W in accordance with a processing program, in the state where the processing head 12 is located at a predetermined position relative to the object (or workpiece) W, by causing the laser beam L to perform a scanning motion with use of the scanning feature of the processing head 12. Alternatively, it is possible to perform a desired laser processing on the target portion of the object W, by making the processing head 12 swing in itself and thereby causing the laser beam L to perform a scanning motion. The laser processing system 10 can further perform a measurement procedure, such as measuring the position or shape of the irradiated point Wp before starting the laser processing, or measuring the processing quality (e.g., the shape) of the irradiated point Wp after finishing the laser processing, in which the irradiated point Wp precisely corresponds to the target portion, by causing the illumination light I to perform a scanning motion in the same way as the laser beam L and causing the illumination light I to be emitted toward the object W along the optical axis 11a of the optical system for processing 11, before starting or after finishing the laser processing.

Data (i.e., three-dimensional measurement data M) of the position or shape of the irradiated point Wp (i.e., the target portion), measured before starting the processing, can be used to correct a command for the position or scanning motion of the processing head 12, which is included in the processing program, as needed.

Data (three-dimensional measurement data M) of the processing quality of the irradiated point Wp (the target portion), measured after finishing the processing, can be used to adjust a laser oscillation parameter, etc., included in the processing program, as needed. It should be noted that the measurement function of the laser processing system 10 is not limited to the measurement of the target portion, but can also be used for, e.g., measuring the position of a reference point (e.g., the corner of a plate-shaped workpiece) set on the object (workpiece) W for the purpose of relative representation of the position of the target portion, or measuring the position or shape of the outer surface of the object W other than a workpiece, which may be an interference during the laser processing.

Figure 2:
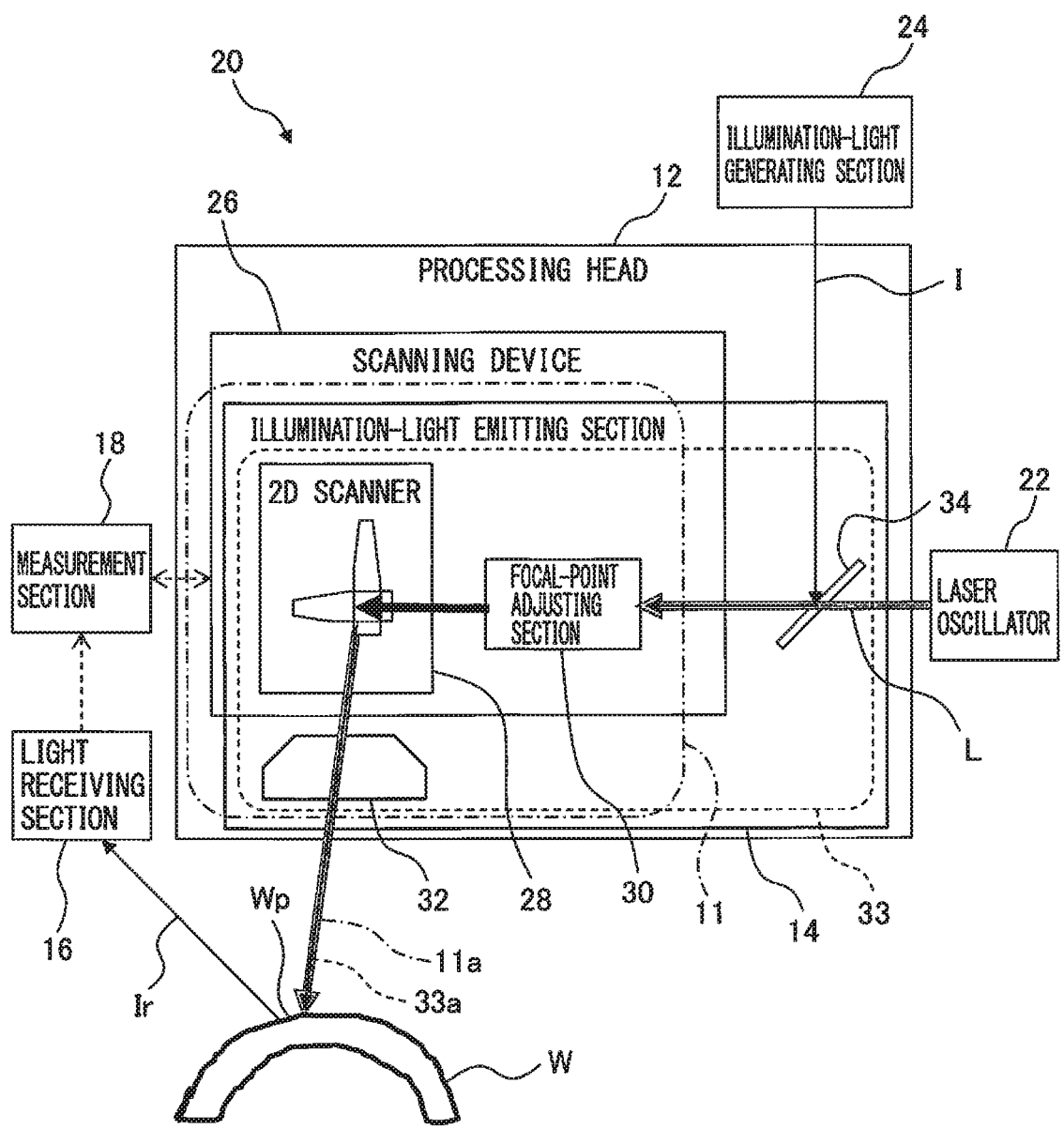
FIG. 2 is a diagram schematically illustrating a laser processing system according to one embodiment.

The functional features of the laser processing system 10 having the aforementioned configuration will further be described below with reference to the configuration of a laser processing system 20 illustrated as one embodiment in FIG. 2. FIG. 2 schematically illustrates the laser processing system 20 according to one embodiment, and the components thereof, corresponding to the components of the laser processing system 10 of FIG. 1, are denoted by common reference numerals with the latter.

The laser processing system 20 includes, in addition to the aforementioned configuration of the laser processing system 10, a laser oscillator 22 configured to oscillate a laser beam L, an illumination-light generating section 24 configured to generate illumination light I, and a scanning device 26 provided in the processing head 12 and configured to cause the laser beam L to perform a scanning motion relative to the object W. The scanning device 26 may include, e.g., a two-dimensional scanner section 28 including two mirrors respectively rotatable about mutually orthogonal first and second axes in a orthogonal three-axis coordinate system, and a focal-point adjusting section 30 disposed anterior to the two-dimensional scanner section 28 and including a plurality of lenses capable of moving in parallel (or translating) in a direction of propagation of the laser beam L. As the two-dimensional scanner section 28 and the focal-point adjusting section 30 appropriately operate, the laser beam L emitted from the scanning device 26 can form an image at a desired spatial position, and can move an imaging point along a desired three-dimensional trajectory.

The processing head 12 includes an optical system for processing 11, such as a lens, a mirror, etc., for guiding the laser beam L oscillated by the laser oscillator 22 to the target portion of the object (or workpiece) W. In this embodiment, the optical system for processing 11 includes the two-dimensional scanner section 28 and the focal-point adjusting section 30, and further includes a condenser or focusing lens (as one example, an f-theta lens) 32 for guiding the laser beam L emitted in a scanning manner from the scanning device 26 in a certain direction and focusing the emitted laser beam. Note that the optical system for processing 11 may be configured without using the condenser lens 32, as in, e.g., a configuration in which the focal-point adjusting section 30 exclusively exerts a function for focusing the laser beam L. In the aforementioned laser processing system 10 of FIG. 1, the optical system for processing 11 of the processing head 12 only has to include at least an appropriate mirror or lens. As an example of a scanning device equipped with the two-dimensional scanner section 28, a galvano-scanner is known.

The illumination-light emitting section 14 includes an optical system for illumination 33, such as a lens, a mirror, etc., for irradiating the irradiated point Wp of the object W with the illumination light I generated by the illumination-light generating section 24. In this embodiment, the optical system for illumination 33 includes a mixing mirror 34 for propagating the illumination light I along the optical axis 11a of the optical system for processing 11 (i.e., with the optical axis 11a as a center line). In this embodiment, the optical system for illumination 33 further includes the two-dimensional scanner section 28, the focal-point adjusting section 30 and the condenser lens 32, which on the other hand are the components of the optical system for processing 11. In this embodiment, therefore, the optical system for illumination 33 has an optical axis 33a coinciding with the optical axis 11a of the optical system for processing 11 at a location posterior to the mixing mirror 34, and the illumination-light emitting section 14 can cause the illumination light I to be emitted in the scanning manner from the processing head 12 via the scanning device 26. Note that, as will be described later, the illumination-light emitting section 14 may cause the illumination light I to be emitted in the scanning manner from the processing head 12, using a means different from the scanning device 26, under the condition that the optical axis 33a of the optical system for illumination 33 coincides with the optical axis 11a of the optical system for processing 11.

The mixing mirror 34 is interposed between the laser oscillator 22 and the focal-point adjusting section 30, as illustrated. According to this arrangement, it is possible to cause the illumination light I to form an image at a desired spatial position, in the same manner as the laser beam L, and also apply the guide-light generating function of an existing scanning device, such as a galvano-scanner, to the illumination-light generating section 24, as will be described later.

Alternatively, although not illustrated, the mixing mirror 34 may be interposed between the two-dimensional scanner section 28 and the focal-point adjusting section 30. According to this arrangement, when a light source, such as a laser pointer, capable of generating small-diameter collimated light is used as the illumination-light generating section 24, it is possible to constantly irradiate the irradiated point Wp with the illumination light I with a uniform illuminance, regardless of the operation of the focal-point adjusting section 30.

The light receiving section 16 includes a light receiving element 36 (FIG. 3) configured to receive a reflection (or reflected light) Ir, and an optical system for light-receiving 38 (FIG. 3), such as a lens, etc., for guiding the reflection Ir to the light receiving element. The light receiving section 16 may be configured as a camera incorporating therein a known image sensing element, such as a CMOS image sensor, etc., and can perform an imaging process for the reflection Ir in an arbitrary exposure time. Note that the configuration in which a predetermined positional relationship is defined between the illumination-light emitting section 14 and the light receiving section 16 can be implemented by, e.g., attaching the light receiving section 16 to the outer surface of a housing (not illustrated) of the processing head 12, or attaching both of the processing head 12 and the light receiving section 16 to a common support member (not illustrated). Since there may be a case where the light receiving section 16 cannot receive the reflection Ir depending on the position of the irradiated point Wp of the object W, the system may be configured so that a plurality of light receiving sections 16 are provided in a predetermined positional relationship with the illumination-light emitting section 14 as needed and respective light receiving sections 16 receive reflections Ir reflected at mutually different irradiated points Wp.

Figure 3:
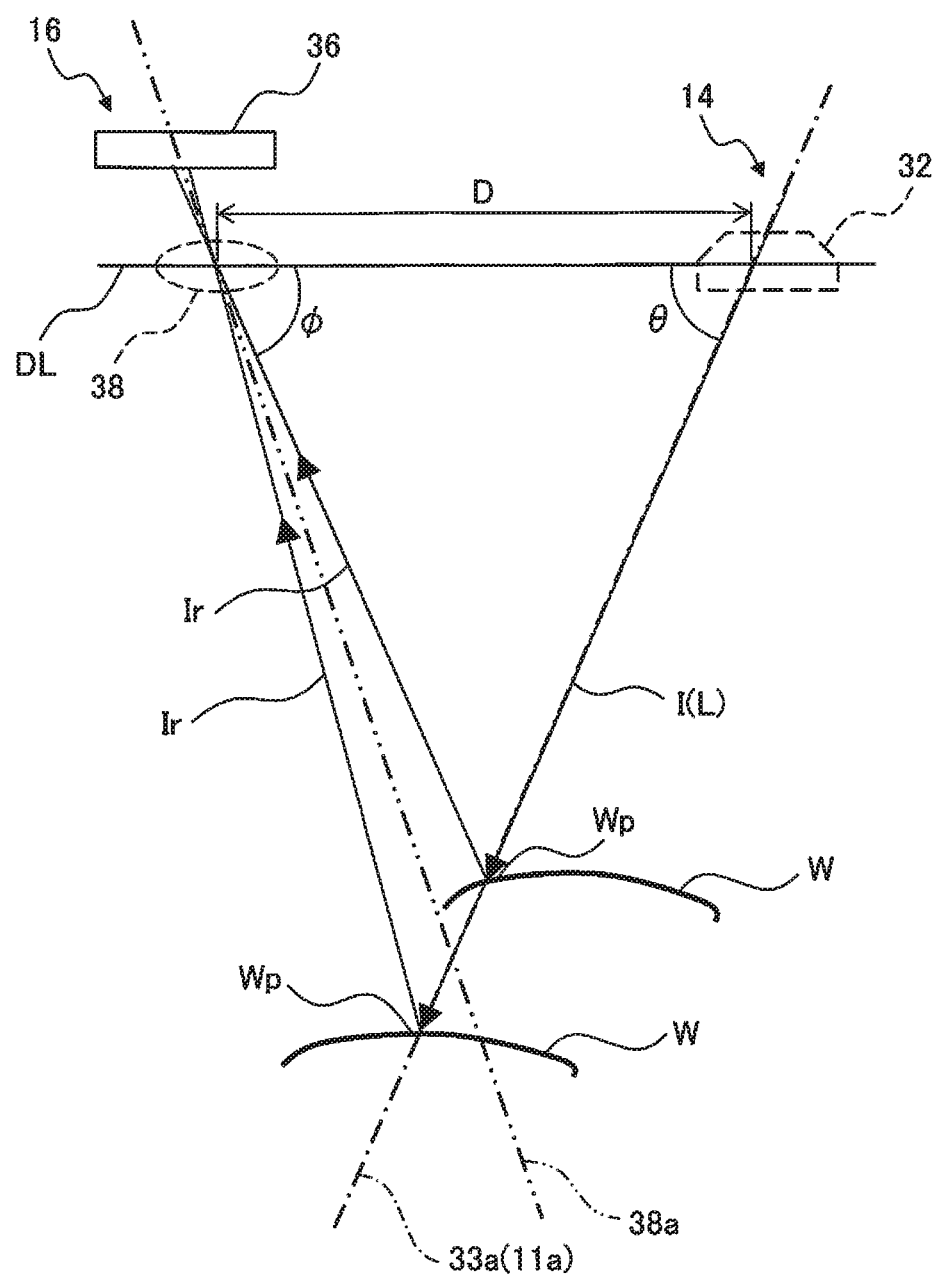
FIG. 3 is a diagram schematically illustrating an exemplary measurement procedure.

The measurement section 18 may be configured as a software for making a processor, such as a CPU (Central Processing Unit) of a computer, etc., operate. Alternatively, the measurement section 18 may be configured as a hardware, such as a processor, etc., capable of partially or entirely executing processes in the software. FIG. 3 schematically illustrates an example of measurement processing of the three-dimensional measurement data M, performed by the measurement section 18. As a precondition for the illustrated measurement processing, the optical system for light-receiving 38 of the light receiving section 16 has an optical axis 38a that does not coincide with (i.e., does not include any portion coinciding with) the optical axis 11a of the optical system for processing 11 of the processing head 12. In the illustrated measurement processing, measurements are first performed in relation to distance D between the outlet end (e.g., the condenser lens 32) of the optical system for illumination 33 of the illumination-light emitting section 14 and the inlet end of the optical system for light-receiving 38 of the light receiving section 16; output angle θ (theta) of the illumination light I emitted from the condenser lens 32 with respect to a segment DL extending along the distance D; and incident angle φ (phi) of the reflection Ir entering the optical system for light-receiving 38 with respect to the segment DL. The distance D is a previously-determined design value. The output angle θ can be obtained from a command for a scanning motion of the scanning device 26 (in particular, of the two-dimensional scanner section 28). The incident angle φ can be obtained from the coordinate values of an incident point on the light receiving element 36. Once the distance D, the output angle θ and the incident angle φ are measured, the spatial coordinates (i.e., three-dimensional measurement data M) of the irradiated point Wp on the object W can be obtained by a known triangulation process. In this manner, the measurement section 18 can obtain the three-dimensional measurement data M by using the operation information of the scanning device 26. Note that a three-dimensional measurement technique, usable in the laser processing system 10, 20, is not limited to the triangulation process.

In the laser processing system 10, 20, an optical cutting method known as one type of triangulation method may be employed as another example of the measurement processing of the three-dimensional measurement data M.

In the optical cutting method, the illumination-light emitting section 14 irradiates the object W with linear illumination light (i.e., slit light) I, the light receiving section 16 performs an imaging process for a linear reflection Ir of the linear illumination light reflected at the irradiated point Wp, and the measurement section 18 processes the linear reflection Ir by triangulation, the linear reflection imaged by the light receiving section 16, so as to obtain the three-dimensional measurement data M. When the position of the point Wp irradiated with the linear illumination light I is shifted in parallel (or translated) and the triangulation process for the linear reflection Ir is performed at respective shifted positions, it is possible to obtain the three-dimensional shape of the object W.

Especially in the laser processing system 20, a pseudo optical-cutting method can also be executed by the operation of the scanning device 26 without using the linear illumination light (or slit light) I. In this configuration, the illumination-light emitting section 14 causes the illumination light I to be emitted toward the object W so as to perform a high-speed scanning motion in a first direction by the rotational motion of the first mirror of the two-dimensional scanner section 28 of the scanning device 26, and irradiates the object W with the illumination light I in such a manner as to cause the imaging point of the illumination light to continuously move along the surface of the object W. The light receiving section 16 performs an imaging process for the trajectory of the imaging point continuously moving in the first direction in an arbitrary exposure time, and thereby obtains captured image data of the linearly-continuous (like a broken or solid line) reflection Ir. The measurement section 18 performs the triangulation process for the captured image data of the linearly-continuous reflection Ir obtained by the light receiving section 16, and thereby obtains the three-dimensional measurement data M of the irradiated point Wp.

In addition, the illumination-light emitting section 14 can cause the position of the trajectory of the continuously-moving imaging point to shift in parallel (or translate) in a second direction intersecting the first direction by the rotational motion of the second mirror of the two-dimensional scanner section 28 of the scanning device 26. When the measurement section 18 performs the triangulation process for the captured image data of the linearly-continuous reflection Ir obtained by the light receiving section 16 at respective positions, it is possible to obtain the three-dimensional shape of the object W. Note that, as will be described later, in a configuration wherein the laser processing system 20 includes a moving device configured to make the object W move relative to the processing head 12 and the light receiving section 16, it is possible to shift the position of the trajectory of the continuously-moving imaging point in the second direction, by the operation of the moving device instead of the rotational motion of the second mirror of the two-dimensional scanner section 28 of the scanning device 26.

Figure 4:
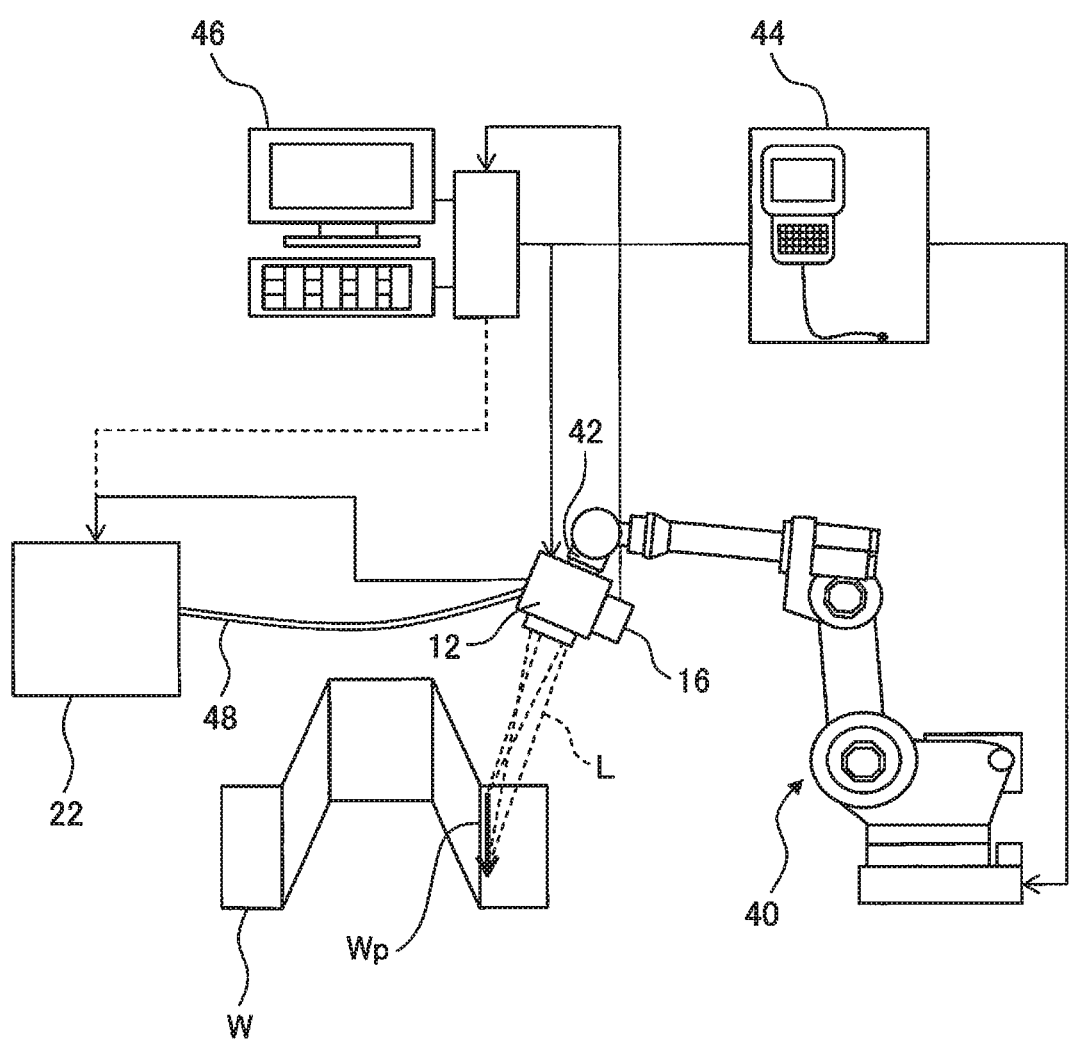
FIG. 4 is a diagram schematically illustrating an application example of the laser processing system.

FIG. 4 schematically illustrates an application example of the laser processing system 10 or 20. In this application example, the processing head 12 and the light receiving section 16 have a predetermined relative positional relationship with each other and, in this state, are attached to an arm end (i.e., a wrist) 42 of a vertical articulated robot 40. In the illustrated example, the light receiving section 16 is fixed at a predetermined position on the outer surface of a housing of the processing head 12. The robot 40 is one embodiment of a moving device (described later with reference to FIG. 9) configured to make the object W move relative to the processing head 12 and the light receiving section 16. A robot controller 44 is connected to the robot 40, and a computer 46 is connected to the robot controller 44. The robot controller 44 is one embodiment of a motion controlling section (described later with reference to FIG. 9) configured to control the operation of the robot 40 (or the moving device). The computer 46 can send an operation command to the robot controller 44 based on a program for operating the robot 40, and the robot controller 44 can make the robot 40 operate in accordance with the operation command. An operator can use the robot controller 44 so as to input a required operation parameter or make the robot 40 perform a jog feed operation. The mechanical configuration (or axes configuration) of the robot 40 is not limited to the illustrated vertical articulated type, and the robot 40 may have various mechanical configurations (or axes configurations), such as a gantry type, a parallel-link type, etc.

In the application example of FIG. 4, the laser oscillator 22 may have various configurations capable of oscillating laser beams L having various powers corresponding to the types of laser processing, by using various media. The laser oscillator 22 is connected to the processing head 12 via a light guide member 48 including an optical fiber, a reflecting mirror, etc., and the laser beam L oscillated by the laser oscillator 22 is guided to the processing head 12 by the light guide member 48. The processing head 12 can continuously or intermittently emit the laser beam L while ensuring the scanning motion of the laser beam by, e.g., the scanning device 26 (FIG. 2), in accordance with a previously-prepared processing program, and thereby perform various types of laser processing to the target portion of the object (or workpiece) W. The robot 40 can operate to position or swing the processing head 12 during a period when the laser beam L is emitted or not emitted, in accordance with the processing program. Further, the processing head 12 can continuously or intermittently emit the illumination light I while ensuring the scanning motion of the illumination light by, e.g., the scanning device 26 (FIG. 2), in accordance with a previously-prepared measurement program, and thereby irradiate the irradiated point Wp on the object W with the illumination light. The robot 40 can operate to swing the processing head 12 independently of, or in superposition on, the operation of the scanning device 26, in accordance with the measurement program. Note that the robot 40 can dispose the processing head 12 at a desired position and a desired orientation (in this specification, a position and an orientation may be collectively referred to as a "position").

The computer 46 can send an operation command to the processing head 12 (or scanning device 26) based on a program for operating the processing head 12 (or scanning device 26). The computer 46 can also have the function of a scanning-motion controlling section (described later with reference to FIG. 10) configured to operate the processing head 12 (or scanning device 26) (i.e., cause the laser beam L or the illumination light I to perform the scanning motion) in accordance with the said operation command. Further, the computer 46 can send an operation command to the laser oscillator 22 based on a program for operating the laser oscillator 22. The computer 46 can also have the function of an oscillation controlling section (described later with reference to FIG. 7) configured to make the laser oscillator 22 oscillate the laser beam L in accordance with the said operation command. The operation command for the laser oscillator 22 may be sent from the computer 46 to the processing head 12, together with the operation command for the processing head 12, and further be sent from the processing head 12 to the laser oscillator 22. This configuration makes it easier to synchronize the operation command for the processing head 12 with the operation command for the laser oscillator 22.

Alternatively, the operation command for the laser oscillator 22 may be directly sent from the computer 46 to the laser oscillator 22.

The computer 46 can send an operation command to the illumination-light generating section 24 (FIG. 2) based on a program for operating the illumination-light generating section 24. The computer 46 can also have the function of a generation control section configured to make the illumination-light generating section 24 generate the illumination light I in accordance with the said operation command. Further, the computer 46 can have the function of the measurement section 18 (FIG. 2) configured to process the reflection Ir received by the light receiving section 16 so as to obtain the three-dimensional measurement data M of the irradiated point Wp.

Figure 5:
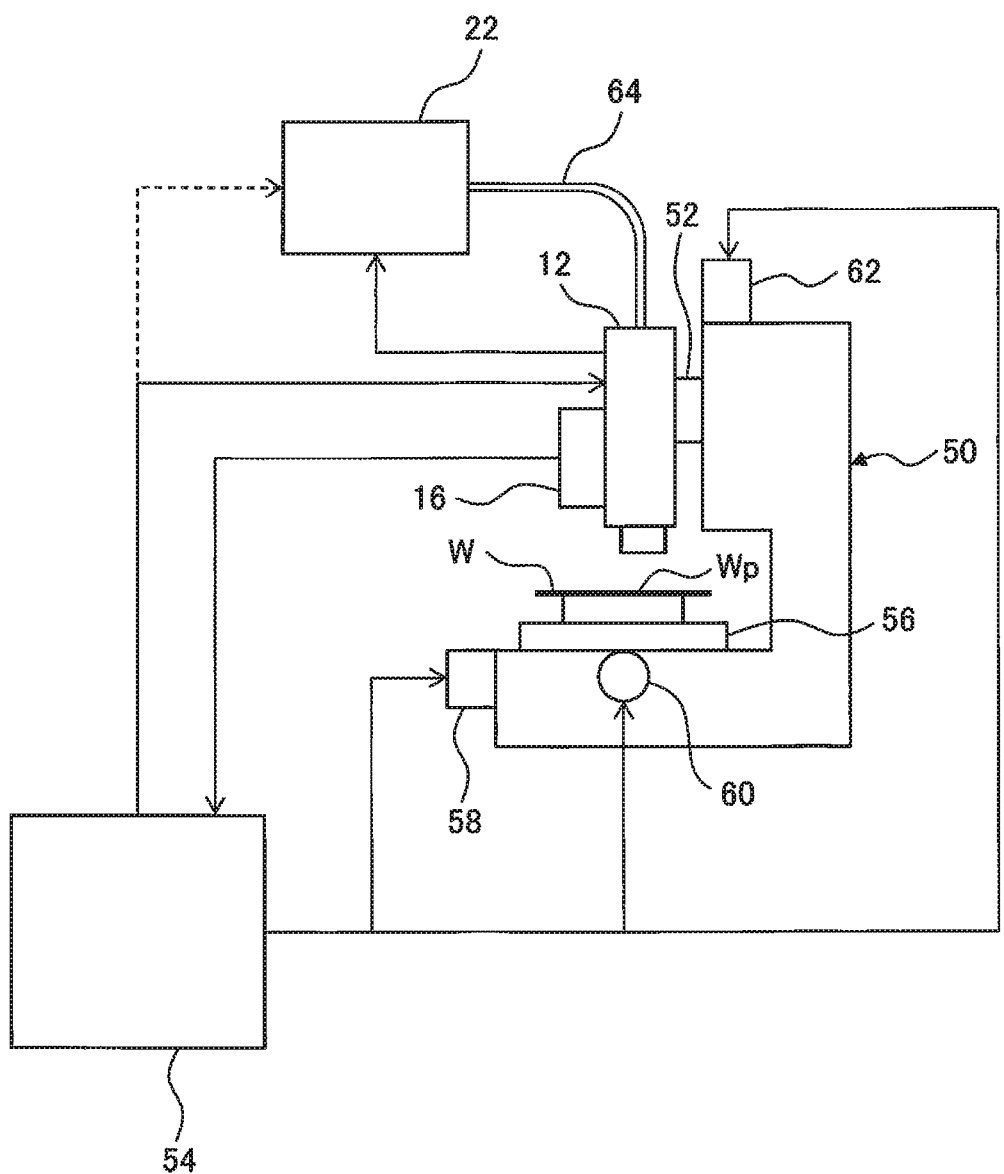
FIG. 5 is a diagram schematically illustrating another application example of the laser processing system.

FIG. 5 schematically illustrates another application example of the laser processing system 10 or 20. In this application example, the processing head 12 and the light receiving section 16 have a predetermined relative positional relationship with each other and, in this state, are attached to a spindle head 52 of a vertical machine tool 50. In the illustrated example, the light receiving section 16 is fixed at a predetermined position on the outer surface of a housing of the processing head 12. The machine tool 50 is another embodiment of the moving device configured to make the object W move relative to the processing head 12 and the light receiving section 16. A controller 54, such as a numerical controller, is connected to the machine tool 50. The controller 54 is another embodiment of the motion controlling section configured to control the operation of the machine tool 50 (or the moving device). The controller 54 can send an operation command to the machine tool 50 based on a program for operating the machine tool 50. In the illustrated example, X-axis movement command and Y-axis movement command are sent from the controller 54 via respective drivers (not illustrated) to an X-axis motor 58 and a Y-axis motor 60, both provided to drive a table 56, and a Z-axis movement command is sent from the controller 54 via a driver (not illustrated) to a Z-axis motor 62 provided to drive the spindle head 52. The mechanical configuration (or axes configuration) of the machine tool 50 is not limited to the illustrated vertical type, and the machine tool 50 may have various mechanical configurations (or axes configurations), such as a horizontal type, a machining center type, etc.

In the application example of FIG. 5, the laser oscillator 22 may have various configurations capable of oscillating laser beams L having various powers corresponding to the types of laser processing, by using various media. The laser oscillator 22 is connected to the processing head 12 via a light guide member 64 including an optical fiber, a reflecting mirror, etc., and the laser beam L oscillated by the laser oscillator 22 is guided to the processing head 12 by the light guide member 64. The processing head 12 can continuously or intermittently emit the laser beam L while ensuring the scanning motion of the laser beam by, e.g., the scanning device 26 (FIG. 2), in accordance with a previously-prepared processing program, and thereby perform various types of laser processing to the target portion of the object (or workpiece) W. The machine tool 50 can move the processing head 12 and the table 56 relative to each other during a period when the laser beam L is emitted or not emitted, in accordance with the processing program.

Further, the processing head 12 can continuously or intermittently emit the illumination light I while ensuring the scanning motion of the illumination light by, e.g., the scanning device 26 (FIG. 2), in accordance with a previously-prepared measurement program, and thereby irradiate the irradiated point Wp on the object W with the illumination light. The machine tool 50 can move the processing head 12 and the table 56 relative to each other independently of, or in superposition on, the operation of the scanning device 26, in accordance with the measurement program.

The controller 54 can send an operation command to the processing head 12 (or scanning device 26) based on a program for operating the processing head 12 (or scanning device 26). The controller 54 can also have the function of a scanning-motion controlling section configured to operate the processing head 12 (or scanning device 26) (i.e., cause the laser beam L or the illumination light I to perform the scanning motion) in accordance with the said operation command. Further, the controller 54 can send an operation command to the laser oscillator 22 based on a program for operating the laser oscillator 22.

The controller 54 can also have the function of an oscillation controlling section configured to make the laser oscillator 22 oscillate the laser beam L in accordance with the said operation command. The operation command for the laser oscillator 22 may be sent from the controller 54 to the processing head 12, together with the operation command for the processing head 12, and further be sent from the processing head 12 to the laser oscillator 22. This configuration makes it easier to synchronize the operation command for the processing head 12 with the operation command for the laser oscillator 22. Alternatively, the operation command for the laser oscillator 22 may be directly sent from the controller 54 to the laser oscillator 22.

The controller 54 can send an operation command to the illumination-light generating section 24 (FIG. 2) based on a program for operating the illumination-light generating section 24. The controller 54 can also have the function of a generation control section configured to make the illumination-light generating section 24 generate the illumination light I in accordance with the said operation command. Further, the controller 54 can have the function of the measurement section 18 (FIG. 2) configured to process the reflection Ir received by the light receiving section 16 so as to obtain the three-dimensional measurement data M of the irradiated point Wp.

The laser processing system 10, 20 having the aforementioned configuration is configured so that the illumination-light emitting section 14 provided in the processing head 12 causes the illumination light I to be emitted toward the object W along the optical axis 11a of the optical system for processing 11, and the light receiving section 16 located in the predetermined positional relationship with the illumination-light emitting section 14 receives the reflection Ir of the illumination light I reflected at the irradiated point Wp on the object W, and therefore it is possible to reduce an influence exerted on the measurement function due to variation in the relative positional relationship between the processing head 12 and the light receiving section 16, even when the processing head 12 or the light receiving section 16 is subjected to thermal displacement or aging.

A supplementary explanation will be provided with reference to FIG. 3. First, in the illustrated configuration, assume that the processing head 12 or the light receiving section 16 is subjected to thermal displacement or aging, whereby the distance D between the illumination-light emitting section 14 and the light receiving section 16 varies to D' (not illustrated) and accordingly the incident angle $\phi$ of the reflection Ir at a certain irradiated point Wp varies to $\phi'$ (not illustrated). When the incident angle $\phi$ varies to $\phi'$, the spatial coordinates (or the three-dimensional measurement data M) of the irradiated point Wp, obtained by using the distance D set as default, also vary, so that the three-dimensional measurement data M contains an error Δ (not illustrated) due to the variation in the positional relationship between the illumination-light emitting section 14 and the light receiving section 16. On the other hand, the position of the processing head 12 provided with the illumination-light emitting section 14 contains, in itself, variation relative to the light receiving section 16, and the illumination light I used during the measurement propagates along the optical axis 11a, along which the laser beam L used during the processing also propagates, so as to irradiate the irradiated point Wp with the illumination light (i.e., the output angle $\theta$ of the illumination light I used during the measurement and the output angle $\theta$ of the laser beam L used during the processing contain a common relative variation with each other). Accordingly, in, e.g., a configuration wherein a command for the position or scanning motion of the processing head 12 is corrected by using the three-dimensional measurement data M, even if the three-dimensional measurement data M contains the error Δ, the error Δ is canceled out by the relative variation included in the position of the processing head 12, and as a result, it is possible to precisely irradiate the target portion before being processed, which corresponds to the measured irradiated point Wp, with the laser beam L, in accordance with the corrected command. Further, in, e.g., a configuration wherein the processing quality of the target portion of the object W is verified by using the three-dimensional measurement data M, even if the three-dimensional measurement data M contains the error Δ, the error Δ is canceled out by the relative variation included in the position of the processing head 12, and as a result, it is possible to precisely verify the processing quality of the target portion after being processed, which corresponds to the measured irradiated point Wp.

In contrast, in, e.g., a system configuration including a conventional processing head that is not provided with the illumination-light emitting section 14 and a conventional measurement device provided with a light-projecting optical system and a light-receiving optical system, if the measurement result obtained by the measurement device is used to correct the position or scanning motion of the processing head in a state where the processing head or the measurement device is subjected to thermal displacement or aging, the system may get into a situation where a position deviated from a target portion is irradiated with the laser beam in accordance with a corrected command, due to variation in relative positional relationship between the processing head and the measurement device. Thus, in the laser processing system 10, 20, it is possible to appropriately investigate whether it is necessary to correct a command for the position or scanning motion of the processing head 12, or appropriately verify the processing quality of the target portion of the object W, by using the three-dimensional measurement data M of the irradiated point Wp obtained by the measurement section 18, while eliminating the influence of the thermal displacement or aging. According to the laser processing system 10, 20, therefore, it is possible to improve a processing accuracy due to the appropriate corrected command, and to improve a processing quality due to, e.g., parameter change based on the appropriate verification.

The laser processing system 10 of FIG. 1 may be implemented not only as the laser processing system 20 of FIG. 2, but also as various embodiments having other configurations. The configurations of laser processing systems according to various embodiments will be described below with reference to FIGS. 6 to 12.

Figure 6:
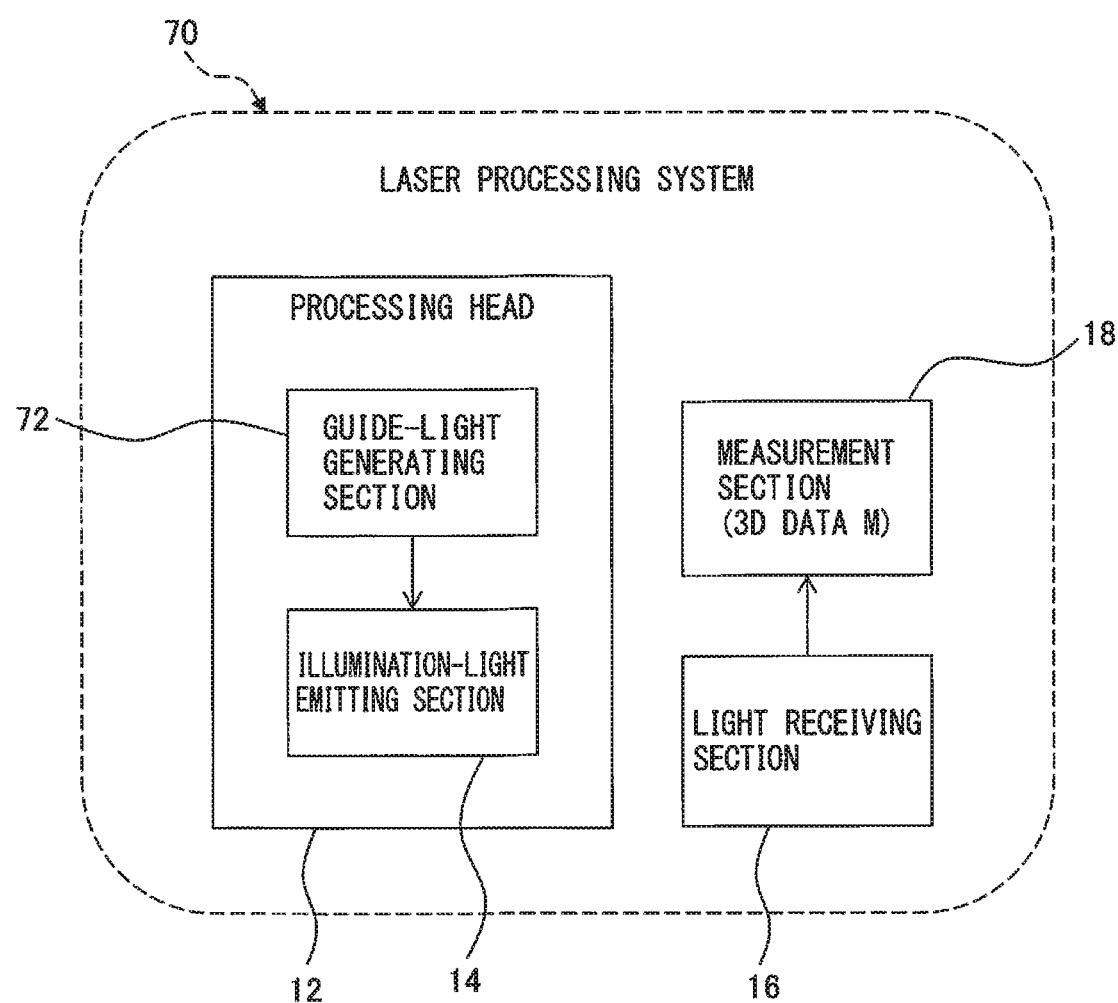
FIG. 6 is a functional block diagram illustrating a laser processing system according to another embodiment.

FIG. 6 illustrates a laser processing system 70 according to another embodiment and having the configuration of the laser processing system 10 of FIG. 1, with use of functional blocks. Components depicted in FIG. 6, corresponding to the components of the laser processing system 10, are denoted by common reference numerals with the latter.

In the laser processing system 70, the processing head 12 includes a guide-light generating section 72 configured to generate guide light used for visualizing a position on an object W (FIG. 1), the position being irradiated with a laser beam L (FIG. 1). The guide-light generating section 72 has a function corresponding to the function of the illumination-light generating section 24 of the laser processing system 20 of FIG. 2, and is provided in the processing head 12 in place of the illumination-light generating section 24. The illumination-light emitting section 14 is configured to cause the guide light generated by the guide-light generating section 72 to be emitted from the processing head 12 as illumination light I (FIG. 1).

The laser processing system 70 may include optical systems 11, 33 and 38 corresponding respectively to the optical systems 11, 33 and 38 of the laser processing system 20 of FIG. 2. In this configuration, the guide light (or illumination light I) generated by the guide-light generating section 72 is made to propagate along the optical axis 11a (FIG. 1) of the optical system for processing 11 by the function of a mixing mirror 34, and guided to a scanning device 26 while maintaining the propagating state. According to this configuration, it is possible to focus the guide light at a desired spatial position, in the same manner as the laser beam L. In an existing scanning device such as a galvano-scanner, a configuration including the guide-light generating section 72 and the mixing mirror 34, in addition to a two-dimensional scanner section 28, a focal-point adjusting section 30 and a condenser lens 32, is known. The laser processing system 70 may be implemented with the existing scanning device having the above known configuration provided in the processing head 12.

Figure 7:
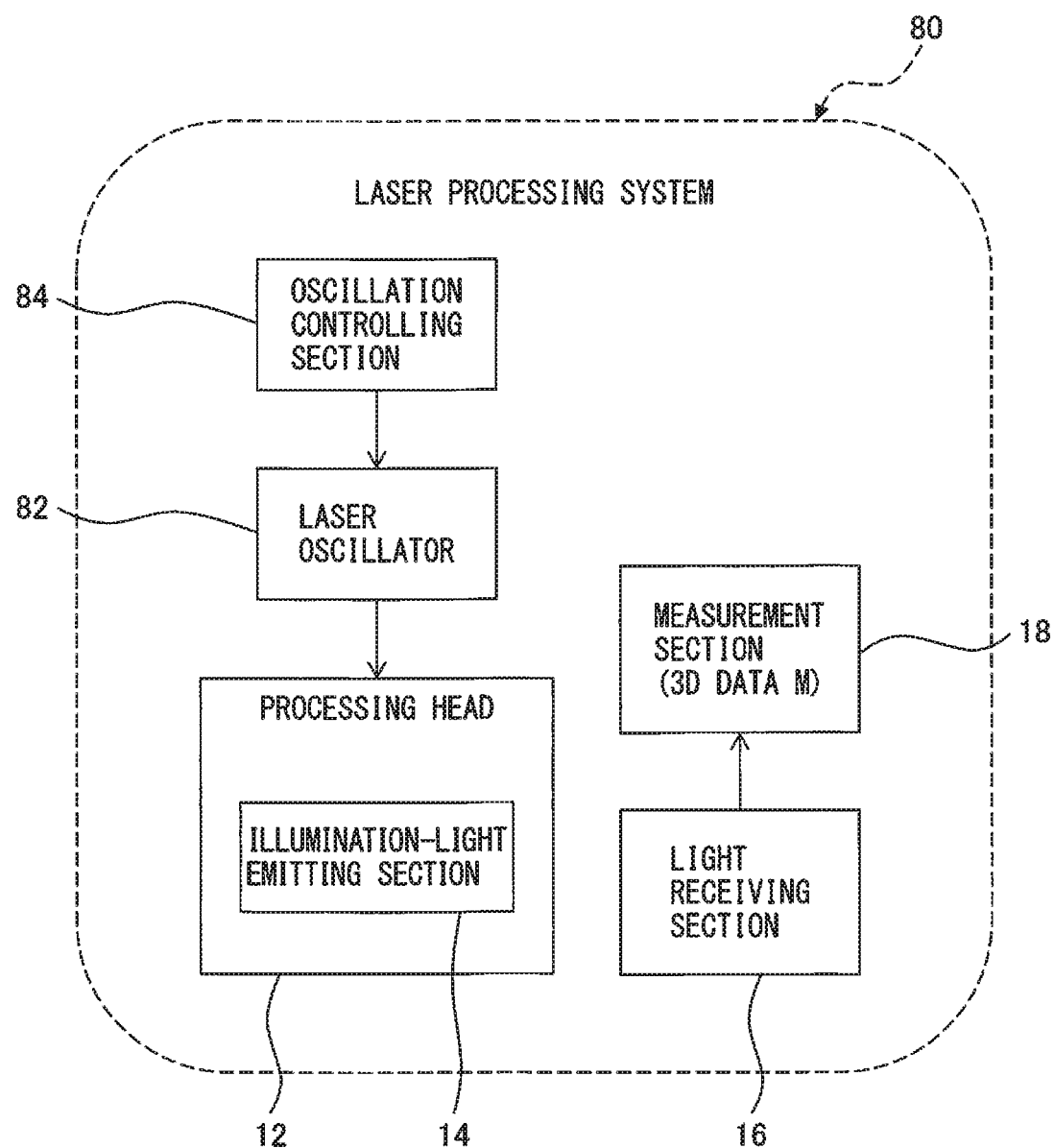
FIG. 7 is a functional block diagram illustrating a laser processing system according to a further embodiment.

FIG. 7 illustrates a laser processing system 80 according to a further embodiment and having the configuration of the laser processing system 10 of FIG. 1, with use of functional blocks. Components depicted in FIG. 7, corresponding to the components of the laser processing system 10, are denoted by common reference numerals with the latter.

The laser processing system 80 further includes a laser oscillator 82 configured to oscillate a laser beam L (FIG. 1), and an oscillation controlling section 84 configured to control the laser oscillator 82. The oscillation controlling section 84 can make the laser oscillator 82 alternatively oscillate either one of a laser beam L for processing and a laser beam L' for illumination (not illustrated) different from the laser beam L for processing. The laser beam L' for illumination has a light intensity lower than that of the laser beam L for processing. The laser oscillator 82 corresponds to the laser oscillator 22 of the laser processing system 20 of FIG. 2. Alternatively, the secondary laser oscillator 82 may be provided in place of the illumination-light generating section 24 of the laser processing system 20. The illumination-light emitting section 14 causes the laser beam L' for illumination to be emitted from the processing head 12 as illumination light I (FIG. 1). Note that the oscillation controlling section 84 may be configured as a software for making a processor, such as a CPU (Central Processing Unit) of a computer, etc., operate. Alternatively, the oscillation controlling section 84 may be configured as a hardware, such as a processor, etc., capable of partially or entirely executing processes in the software.

The laser processing system 80 may include optical systems 11, 33 and 38 corresponding respectively to the optical systems 11, 33 and 38 of the laser processing system 20 of FIG. 2. In a configuration wherein the laser oscillator 82 corresponds to the laser oscillator 22, the mixing mirror 34 is omitted, and the laser beam L' for illumination (or illumination light I) is made to propagate along the optical axis 11a (FIG. 1) of the optical system for processing 11, and guided to a scanning device 26 while maintaining the propagating state. On the other hand, in a configuration wherein the laser oscillator 82 corresponds to the illumination-light generating section 24, the laser beam L' for illumination (or illumination light I) is made to propagate along the optical axis 11a (FIG. 1) of the optical system for processing 11 by the function of the mixing mirror 34, and guided to the scanning device 26 while maintaining the propagating state. In both cases, it is possible to cause the laser beam L' for illumination to form an image at a desired spatial position, in the same manner as the laser beam L for processing. The laser processing system 70 of FIG. 6 and the laser processing system 80 of FIG. 7 have the advantages of appropriately applying the configuration of an existing scanning-type laser processing system.

Figure 8:
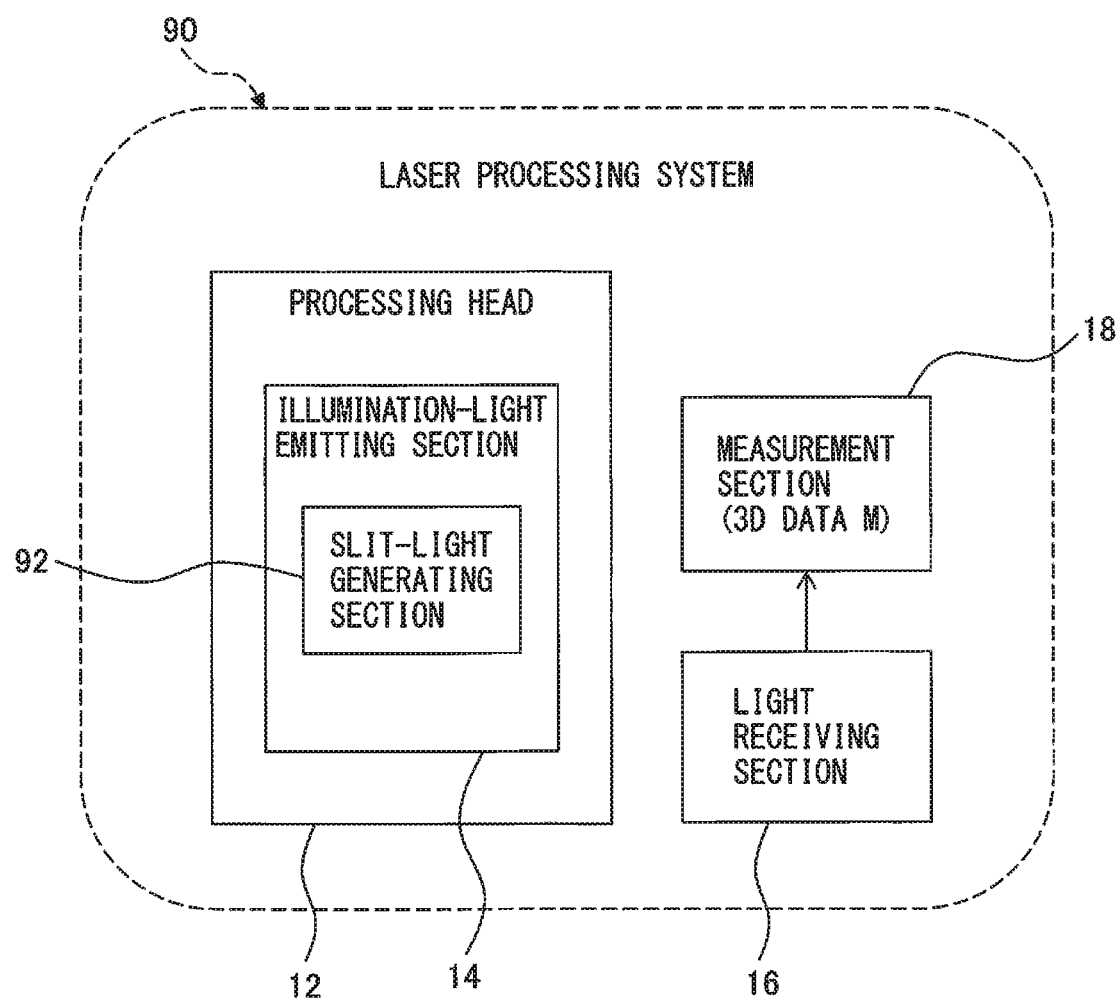
FIG. 8 is a functional block diagram illustrating a laser processing system according to a further embodiment.

FIG. 8 illustrates a laser processing system 90 according to a further embodiment and having the configuration of the laser processing system 10 of FIG. 1, with use of functional blocks. Components depicted in FIG. 8, corresponding to the components of the laser processing system 10, are denoted by common reference numerals with the latter.

In the laser processing system 90, the illumination-light emitting section 14 includes a slit-light generating section 92 configured to form illumination light I (FIG. 1) into a slit shape. The slit-light generating section 92 may be configured by, e.g., an optical element referred to as a cylindrical lens provided in a conventional measurement device provided with a light-projecting optical system and a light-receiving optical system. The cylindrical lens may be disposed, e.g., posterior to the illumination-light generating section 24 of the laser processing system 20 of FIG. 2. A measurement device including the cylindrical lens can execute a triangulation process known as an optical cutting method. The illumination-light emitting section 14 causes the illumination light I formed into the slit shape to be emitted from the processing head 12.

The laser processing system 90 may include optical systems 11, 33 and 38 corresponding respectively to the optical systems 11, 33 and 38 of the laser processing system 20 of FIG. 2. In this configuration, the illumination light I formed into the slit shape by the slit-light generating section 92 is made to propagate along the optical axis 11a (FIG. 1) of the optical system for processing 11 by the function of a mixing mirror 34, and guided to a scanning device 26 while maintaining the propagating state. According to this configuration, it is possible to cause the slit-shaped illumination light I to form an image at a desired spatial position, in the same manner as the laser beam L. When the slit-shaped illumination light I is used, it is possible to cause the illumination light I to perform a scanning motion required for measurement, by moving only one mirror of a two-dimensional scanner section 28 so as to shift in parallel the slit-shaped illumination light I.

As already described, in a configuration wherein the illumination-light emitting section 14 causes the illumination light I to perform a scanning motion in a first direction by the high-speed rotational motion of the first mirror of the scanning device 26 and irradiate the object W with the illumination light I, and the measurement section 18 processes the trajectory of the imaging point of the illumination light I, the imaging point moving along the object W, as the linearly continuous reflection Ir reflected at the irradiated point Wp, the scanning device 26 or a scanning-motion controlling section (described later with reference to FIG. 10) configured to control the scanning motion thereof functions as the slit-light generating section 92. In this configuration, it is possible to eliminate additional optical element such as a cylindrical lens.

Note that the slit-light generating section 92 may be additionally provided to the aforementioned laser processing system 70 or 80.

Figure 9:
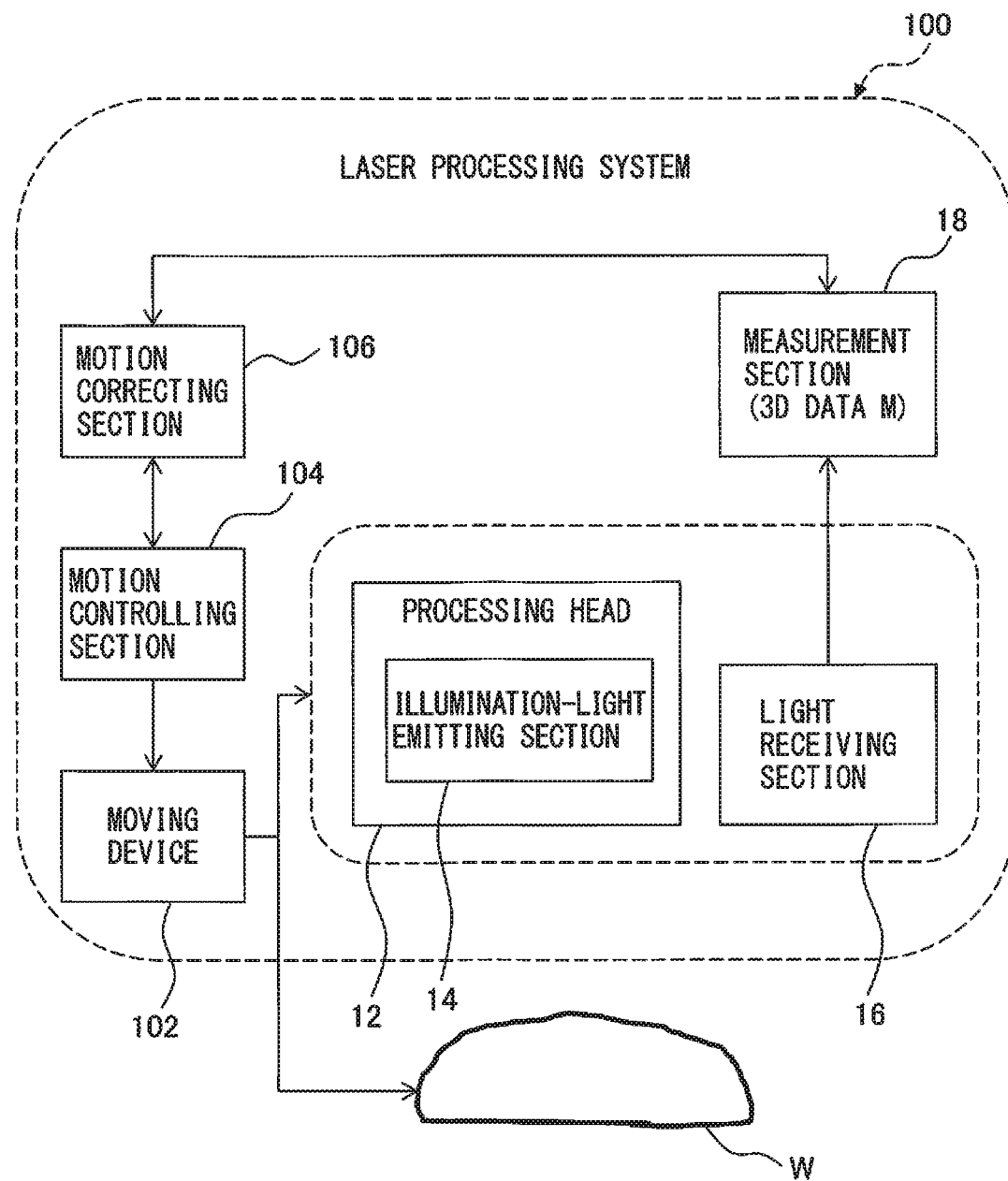
FIG. 9 is a functional block diagram illustrating a laser processing system according to a further embodiment.

FIG. 9 illustrates a laser processing system 100 according to a further embodiment and having the configuration of the laser processing system 10 of FIG. 1, with use of functional blocks. Components depicted in FIG. 9, corresponding to the components of the laser processing system 10, are denoted by common reference numerals with the latter.

The laser processing system 100 further includes a moving device 102 configured to make an object W move relative to the processing head 12 and the light receiving section 16, and a motion controlling section 104 configured to control the operation of the moving device 102. The motion controlling section 104 can cause illumination light I (FIG. 1) to perform a scanning motion by the operation of the moving device 102, the illumination light I being emitted from the processing head 12 by the function of the illumination-light emitting section 14. The motion controlling section 104 may be configured as a software for making a processor, such as a CPU (Central Processing Unit) of a computer, etc., operate. Alternatively, the motion controlling section 104 may be configured as a hardware, such as a processor, etc., capable of partially or entirely executing processes in the software.

The laser processing system 100 may include optical systems 11, 33 and 38 corresponding respectively to the optical systems 11, 33 and 38 of the laser processing system 20 of FIG. 2. In this configuration, the illumination light I emitted from the processing head 12 can perform the scanning motion by the operation of the moving device 102, not by the operation of a scanning device 26, and form an image at a desired spatial position. Alternatively, the operation of the scanning device 26 may be superposed on the operation of the moving device 102, so as to cause the illumination light I to form an image at a desired spatial position. In a case where the operation of the scanning device 26 is insufficient to ensure a scanning area of the illumination light I relative to the object W, it is possible to ensure the scanning area of the illumination light I by adding the operation of the moving device 102.

In this configuration, the measurement section 18 can obtain three-dimensional measurement data M by using the operation information of at least one of the scanning device 26 and the moving device 102.

The laser processing system 100 may further include a motion correcting section 106 configured to correct the operation of the moving device 102 based on the three-dimensional measurement data M obtained by the measurement section 18. The motion correcting section 106 can determine a target position (three-dimensional coordinates) of the target portion based on a position command for the moving device 102 and an operation command for the processing head 12 (or scanning device 26), both described in the processing program, and perform correction to change the position command for the moving device 102 in a case where error between the target position and the three-dimensional measurement data M exceeds a predetermined threshold value. More specifically, the motion correcting section 106 can write the error between the target position and the three-dimensional measurement data M into the processing program as an offset, or in some cases, rewrite the processing program itself. In an analogous manner, the motion correcting section 106 can determine a target position (three-dimensional coordinates) of the target portion based on an operation command for the processing head 12 (or a command for making the processing head 12 swing) described in the processing program, and perform correction to change the operation command for the moving device 102 in a case where error between the target position and the three-dimensional measurement data M exceeds a predetermined threshold value. The motion correcting section 106 may be configured as a software for making a processor, such as a CPU (Central Processing Unit) of a computer, etc., operate. Alternatively, the motion correcting section 106 may be configured as a hardware, such as a processor, etc., capable of partially or entirely executing processes in the software. Note that the moving device 102, the motion controlling section 104 and the motion correcting section 106 may be additionally provided to the aforementioned laser processing system 70, 80 or 90.

Figure 10:
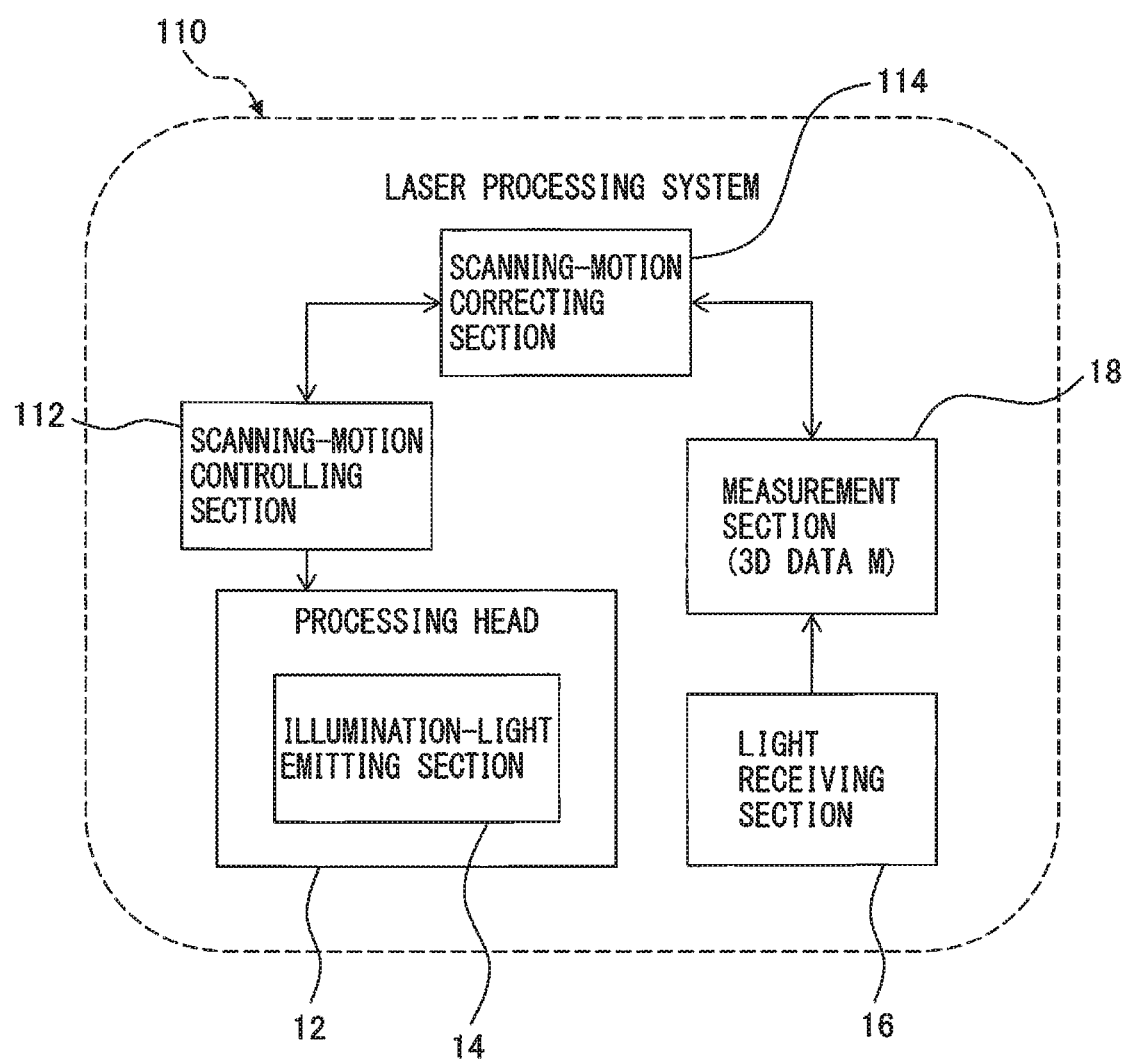
FIG. 10 is a functional block diagram illustrating a laser processing system according to a further embodiment.

FIG. 10 illustrates a laser processing system 110 according to a further embodiment and having the configuration of the laser processing system 10 of FIG. 1, with use of functional blocks. Components depicted in FIG. 10, corresponding to the components of the laser processing system 10, are denoted by common reference numerals with the latter.

The laser processing system 110 further includes a scanning-motion controlling section 112 configured to control the scanning motion of a laser beam L or illumination light I, and a scanning-motion correcting section 114 configured to correct the scanning motion of the laser beam L based on three-dimensional measurement data M obtained by the measurement section 18. The scanning-motion controlling section 112 can cause the laser beam L to perform the scanning motion in accordance with a scanning-motion command for the laser beam L described in the processing program, and cause the illumination light I to perform the scanning motion in accordance with a scanning-motion command for the illumination light I described in the measurement program. The scanning-motion correcting section 114 can determine a target position (three-dimensional coordinates) of the target portion based on the scanning-motion command for the laser beam L, and, in a case where error between the target position and the three-dimensional measurement data M exceeds a predetermined threshold value, correct the scanning motion of the laser beam L so as to reduce or eliminate the error. Each of the scanning-motion controlling section 112 and the scanning-motion correcting section 114 may be configured as a software for making a processor, such as a CPU (Central Processing Unit) of a computer, etc., operate. Alternatively, each of the scanning-motion controlling section 112 and the scanning-motion correcting section 114 may be configured as a hardware, such as a processor, etc., capable of partially or entirely executing processes in the software.

The laser processing system 110 may include optical systems 11, 33 and 38 corresponding respectively to the optical systems 11, 33 and 38 of the laser processing system 20 of FIG. 2. The laser processing system 110 may also include the moving device 102 of the laser processing system 100 of FIG. 9. In this configuration, the scanning-motion controlling section 112 can control the operation of a scanning device 26 and/or the moving device 102 in accordance with the scanning-motion command for the laser beam L or the illumination light I. The scanning-motion correcting section 114 can determine a target position (three-dimensional coordinates) of the target portion based on a position command for the moving device 102 and an operation command for the processing head 12 (or scanning device 26), both described in the processing program, and perform correction to change at least one of the position command for the moving device 102 and the operation command for the scanning device 26 in a case where error between the target position and the three-dimensional measurement data M exceeds a predetermined threshold value, so as to send the changed command(s) to the scanning-motion controlling section 112.

The scanning-motion controlling section 112 may be configured to control the scanning motion of the illumination light I depending on a measurement accuracy required in measuring the irradiated point Wp on an object W. For example, the scanning-motion controlling section 112 can cause the illumination light I to perform the scanning motion so as to change the line density (i.e., the density of parallel arrangement of the trajectory of the aforementioned continuously-moving imaging point) of the illumination light I used for scanning the object W, depending on the required measurement accuracy. More specifically, in a case where the required measurement accuracy is low, the line density of the illumination light I may be set low (e.g., about a line interval of 1 mm, about an angle of 1° of the illumination light I between adjacent lines, etc.), and in a case where the required measurement accuracy is high, the line density of the illumination light I may be set about 10 times the line density for the lower accuracy. The above control of the scanning motion of the illumination light I may be performed depending on different measurement accuracies required for different objects W, or depending on irradiated points Wp having different measurement accuracies required for a single object W. The scanning-motion controlling section 112 and the scanning-motion correcting section 114 may be additionally provided to the aforementioned laser processing system 70, 80 or 90.

Figure 11:
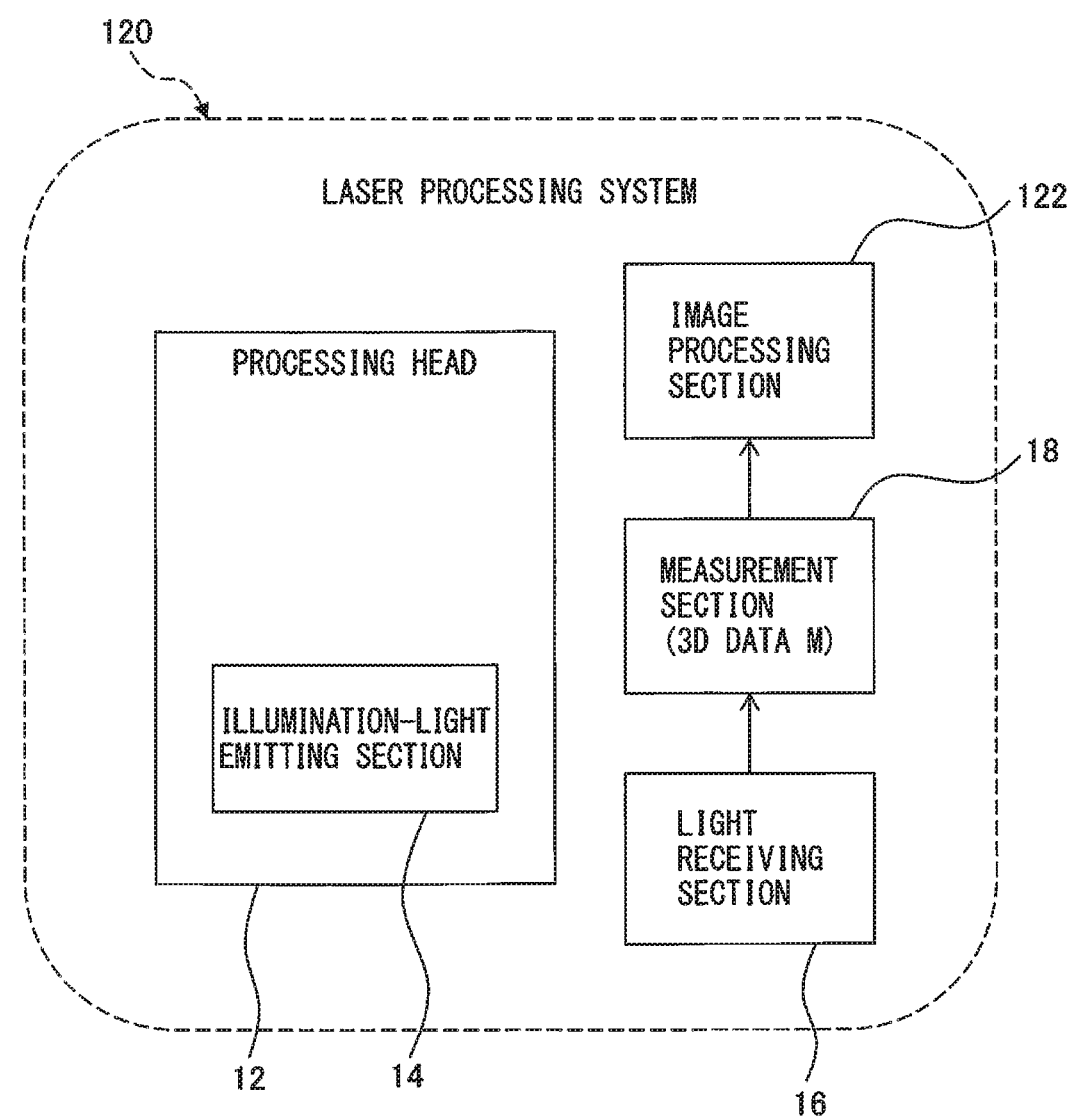
FIG. 11 is a functional block diagram illustrating a laser processing system according to a further embodiment.

FIG. 11 illustrates a laser processing system 120 according to a further embodiment and having the configuration of the laser processing system 10 of FIG. 1, with use of functional blocks. Components depicted in FIG. 11, corresponding to the components of the laser processing system 10, are denoted by common reference numerals with the latter.

The laser processing system 120 further includes an image processing section 122 configured to generate an image representing the shape (including a shape and dimensions, in a more limited sense) of the irradiated point Wp, based on three-dimensional measurement data M obtained by the measurement section 18. The image processing section 122 can perform image processing on the three-dimensional measurement data M of the irradiated point Wp (or the target portion) measured after the processing is finished, and display on, e.g., a display unit (not illustrated) the image representing the shape and/or dimensions of the irradiated point Wp by line drawing, color, numerical value, etc. An operator can verify the processing quality of the irradiated point Wp (or the target portion) based on the image displayed on the display unit, and adjust a laser oscillation parameter, etc., included in the processing program, as needed. The image processing section 122 may be configured as a software for making a processor, such as a CPU (Central Processing Unit) of a computer, etc., operate. Alternatively, the image processing section 122 may be configured as a hardware, such as a processor, etc., capable of partially or entirely executing processes in the software.

The processing quality that can be verified based on the three-dimensional measurement data M of the irradiated point Wp (or the target portion) may be, e.g., the accuracy of a relative position between a pair of welded members, the accuracy of a shape of a portion processed by welding or cutting, etc. More specifically, the processing quality verified for laser welding may involve linear misalignment, appearance (irregularity, etc.), throat depth, bead shape, overlap, undercut, crack, etc. On the other hand, the processing quality verified for laser soldering may involve dimension or shape of soldering, relative position between a land and a solder, etc. Note that, the image processing section 122 may be additionally provided to the aforementioned laser processing system 70, 80, 90, 100 or 110.

Figure 12:
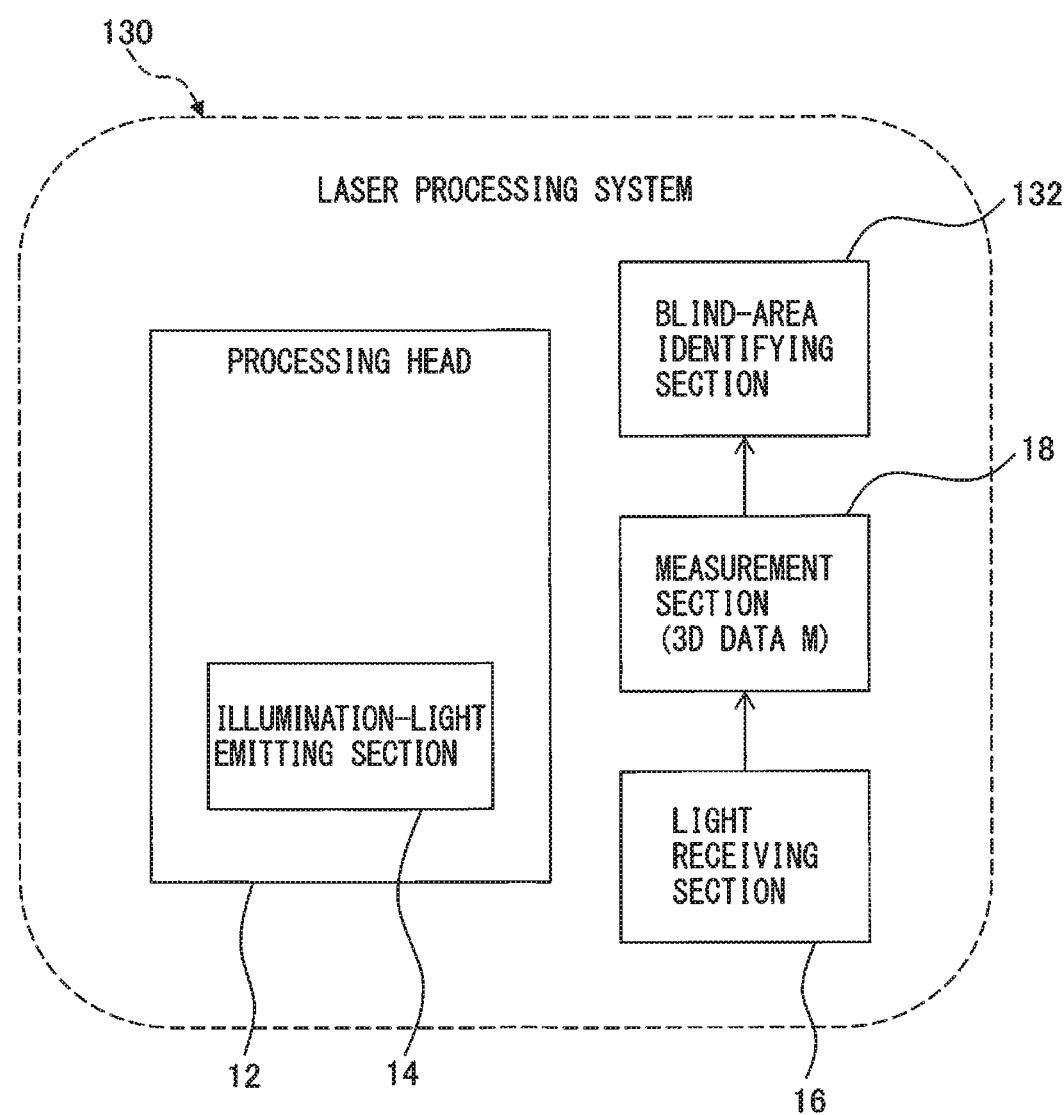
FIG. 12 is a functional block diagram illustrating a laser processing system according to a further embodiment.

FIG. 12 illustrates a laser processing system 130 according to a further embodiment and having the configuration of the laser processing system 10 of FIG. 1, with use of functional blocks. Components depicted in FIG. 12, corresponding to the components of the laser processing system 10, are denoted by common reference numerals with the latter.

The laser processing system 130 further includes a blind-area identifying section 132 configured to identify a blind area on an object W, which is not irradiated with a laser beam L or illumination light I, based on three-dimensional measurement data M obtained by a measurement section 18. The blind-area identifying section 132 can identify a spatial position corresponding to an irradiated point Wp, at which no three-dimensional measurement data M is obtained, among the irradiated points Wp on the object W, as a "blind area" that means the irradiated point Wp unable to be processed by the laser processing by the processing head 12 located at a position where the said irradiated point Wp is irradiated with the illumination light I. As already described, the "blind area" can be reduced to a certain extent by appropriately arranging a plurality of light receiving units 16, but the provision of the blind-area identifying section 132 makes it possible to further deal with a change in shape of the object W, etc. The blind-area identifying section 132 may be configured as a software for making a processor, such as a CPU (Central Processing Unit) of a computer, etc., operate. Alternatively, the blind-area identifying section 132 may be configured as a hardware, such as a processor, etc., capable of partially or entirely executing processes in the software.

The laser processing system 130 may include optical systems 11, 33 and 38 corresponding respectively to the optical systems 11, 33 and 38 of the laser processing system 20 of FIG. 2. The laser processing system 130 may also include the moving device 102, the motion controlling section 104 and the motion correcting section 106 of the laser processing system 100 of FIG. 9, and/or the scanning-motion controlling section 112 and the scanning-motion correcting section 114 of the laser processing system 110 of FIG. 10. In this configuration, it is possible to correct a position command for the moving device 102 and/or operation commands for a scanning device 26 and the moving device 102 (i.e., scanning-motion command for the laser beam L), so as to enable the blind area on the object W, identified by the blind-area identifying section 132, to be processed by the laser processing. Further, it is possible to correct a position command for the moving device 102 and/or operation commands for the scanning device 26 and the moving device 102 (i.e., scanning-motion command for the illumination light I), so as to enable the blind area on the object W, identified by the blind-area identifying section 132, to be measured. The blind-area identifying section 132 may be additionally provided to the aforementioned laser processing system 70, 80, 90 or 120.

While the embodiments of the disclosure have been described, it will be understood, by those skilled in the art, that various changes or modifications may be made thereto without departing from the scope of the following claims.

The invention claimed is:

1. A laser processing system, comprising:
a processing head including a processing-use optical system and configured to irradiate an object with a processing-use laser beam in a scanning manner via the processing-use optical system so as to perform laser processing on the object, wherein the laser processing includes cutting, welding, or heat treating the object;
an illumination-light emitting section provided in the processing head and configured to cause light generated by a light source to be emitted from the processing head toward the object, the illumination-light emitting section including an illumination-use optical system and configured to cause illumination light, different from the processing-use laser beam, to be emitted via the illumination-use optical system along an optical axis of the processing-use optical system so as to irradiate and illuminate the object with the illumination light;
a light receiving section located in a predetermined positional relationship with the illumination-light emitting section, and configured to receive a reflection of the illumination light reflected at an irradiated point on the object; and
a measurement section configured to process the reflection received by the light receiving section and obtain three-dimensional measurement data of the irradiated point.

2. The laser processing system of claim 1, wherein the light receiving section has an optical axis that does not coincide with the optical axis of the processing-use optical system.

3. The laser processing system of claim 1, wherein the measurement section is configured to process the reflection by triangulation so as to obtain the three-dimensional measurement data.

4. The laser processing system of claim 1, wherein
the processing head includes a scanning device which forms a part of the processing-use optical system and is configured to cause the processing-use laser beam to perform a scanning motion, and
the scanning device also forms a part of the illumination-use optical system and is configured to cause the illumination light to be emitted from the processing head in a scanning manner via the scanning device.

5. The laser processing system of claim 4, wherein the measurement section is configured to obtain the three-dimensional measurement data by using operation information of the scanning device.

6. A laser processing system for performing various types of laser processing, the laser processing system comprising:
a processing head configured to irradiate an object with a laser beam in a scanning manner via a processing-use optical system;
an illumination-light emitting section provided in the processing head, the illumination-light emitting section including an illumination-use optical system and configured to cause illumination light generated by a light source to be emitted via the illumination-use optical system from the processing head toward the object along an optical axis of the processing-use optical system;
a light receiving section located in a predetermined positional relationship with the illumination-light emitting section, and configured to receive a reflection of the illumination light reflected at an irradiated point on the object; and
a measurement section configured to process the reflection received by the light receiving section and obtain three-dimensional measurement data of the irradiated point,
wherein
the processing head includes a scanning device configured to cause the laser beam to perform a scanning motion, the illumination-light emitting section is configured to cause the illumination light to be emitted from the processing head in a scanning manner via the scanning device, the illumination-light emitting section is configured to cause the illumination light to perform a scanning motion in a first direction by an operation of the scanning device and irradiate the object with the illumination light, the light receiving section is configured to process a trajectory of an imaging point of the illumination light, the imaging point moving in the first direction along the object, so as to obtain captured image data of a linearly-continuous reflection, and the measurement section is configured to process the captured image data so as to obtain the three-dimensional measurement data.

7. The laser processing system of claim 6, wherein the illumination-light emitting section is configured to cause a position of the trajectory of the imaging point to shift in a second direction intersecting the first direction by the operation of the scanning device.

8. The laser processing system of claim 1, further comprising:
 a moving device configured to make the object move relative to the processing head and the light receiving section; and
 a motion controlling section configured to control an operation of the moving device.

9. The laser processing system of claim 8, wherein the motion controlling section is configured to cause the illumination light to perform a scanning motion by the operation of the moving device.

10. A laser processing system for performing various types of laser processing, the laser processing system comprising:
 a processing head configured to irradiate an object with a laser beam in a scanning manner via a processing-use optical system;
 an illumination-light emitting section provided in the processing head, the illumination-light emitting section including an illumination-use optical system and configured to cause illumination light generated by a light source to be emitted via the illumination-use optical system from the processing head toward the object along an optical axis of the processing-use optical system;
 a light receiving section located in a predetermined positional relationship with the illumination-light emitting section, and configured to receive a reflection of the illumination light reflected at an irradiated point on the object;
 a measurement section configured to process the reflection received by the light receiving section and obtain three-dimensional measurement data of the irradiated point;
 a moving device configured to make the object move relative to the processing head and the light receiving section;
 a motion controlling section configured to control an operation of the moving device; and
 a motion correcting section configured to correct the operation of the moving device based on the three-dimensional measurement data.

11. A laser processing system for performing various types of laser processing, the laser processing system comprising:
 a processing head configured to irradiate an object with a laser beam in a scanning manner via a processing-use optical system;
 an illumination-light emitting section provided in the processing head, the illumination-light emitting section including an illumination-use optical system and configured to cause illumination light generated by a light source to be emitted via the illumination-use optical system from the processing head toward the object along an optical axis of the processing-use optical system;
 a light receiving section located in a predetermined positional relationship with the illumination-light emitting section, and configured to receive a reflection of the illumination light reflected at an irradiated point on the object;
 a measurement section configured to process the reflection received by the light receiving section and obtain three-dimensional measurement data of the irradiated point;
 a scanning-motion controlling section configured to control a scanning motion of the laser beam or the illumination light; and
 a scanning-motion correcting section configured to correct the scanning motion of the laser beam based on the three-dimensional measurement data.

12. The laser processing system of claim 1, further comprising:
 an image processing section configured to generate an image representing a shape of the irradiated point based on the three-dimensional measurement data.

13. A laser processing system for performing various types of laser processing, the laser processing system comprising:
 a processing head configured to irradiate an object with a laser beam in a scanning manner via a processing-use optical system;
 an illumination-light emitting section provided in the processing head, the illumination-light emitting section including an illumination-use optical system and configured to cause illumination light generated by a light source to be emitted via the illumination-use optical system from the processing head toward the object along an optical axis of the processing-use optical system;
 a light receiving section located in a predetermined positional relationship with the illumination-light emitting section, and configured to receive a reflection of the illumination light reflected at an irradiated point on the object;
 a measurement section configured to process the reflection received by the light receiving section and obtain three-dimensional measurement data of the irradiated point; and
 a blind-area identifying section configured to identify a blind area on the object, the blind area being not irradiated with the laser beam or the illumination light, based on the three-dimensional measurement data.

14. The laser processing system of claim 1, wherein
 the processing head includes a guide-light generator including the light source configured to generate guide light for visualizing a position on the object, the position being irradiated with the processing-use laser beam, and
 the illumination-light emitting section is configured to cause the guide light to be emitted from the processing head as the illumination light.

15. The laser processing system of claim 1, further comprising:
- a laser oscillator configured to oscillate the processing-use laser beam; and
- an oscillation controlling section configured to control the laser oscillator, the oscillation controlling section being configured to make the laser oscillator alternatively oscillate either one of the processing-use laser beam and an illumination-use laser beam different from the processing-use laser beam,
- wherein the illumination-light emitting section is configured to cause the illumination-use laser beam to be emitted from the processing head as the illumination light.

\* \* \* \* \*